United States Patent [19]
Hornung

[11] Patent Number: 6,129,446
[45] Date of Patent: Oct. 10, 2000

[54] INSIDE LIGHT

[75] Inventor: Heinz Hornung, Kirchentellinsfurt, Germany

[73] Assignee: Sidler GmbH & Co., Tuebingen, Germany

[21] Appl. No.: 08/858,149

[22] Filed: May 19, 1997

[30] Foreign Application Priority Data

Jun. 15, 1996 [DE] Germany .................. 196 24 013

[51] Int. Cl.$^7$ ..................... F21V 23/04
[52] U.S. Cl. .............. 362/394; 362/295; 362/512
[58] Field of Search .................. 362/282, 287, 362/295, 372, 427, 394, 490, 493, 512, 523, 548, 322, 371

[56] References Cited

U.S. PATENT DOCUMENTS

| 2,673,914 | 3/1954 | Sundt | 362/295 |
| 3,671,739 | 6/1972 | McCain | 362/295 |
| 5,325,275 | 6/1994 | Liu | 362/490 |

FOREIGN PATENT DOCUMENTS 1271827  7/1968  Germany .

Primary Examiner—Y. Quach
Attorney, Agent, or Firm—Paul Vincent

[57] ABSTRACT

A light (1) for vehicles having a switch (2) and a pivotably mounted window (25) for illumination whose pivoting causes operation of the switch (2), is characterized in that the switch (2) has a contact lever (4) mounted in a pivotable fashion about an axis of rotation (3), with the contact lever (4) having an operation arm (5) extending in a first direction away from the axis of rotation (3) as well as a contact arm (6) extending in a second direction away from the axis of rotation (3), wherein the operation arm (5) has an operation region (7) having a first separation with respect to the axis of rotation (3) and the contact arm (6) has a contact region (8) having a second separation with respect to the axis of rotation (3), wherein the second separation is larger than the first separation and, by means of a directed motion of the operation arm (5) in the operation region (7), the contact lever (4) pivots about the axis of rotation (3) and the contact region (8) moves in such a fashion as to operate the switch (2). The window (25) is coupled to the operation region (7). This lighting configuration is economical and guarantees a reliable switching while simultaneously satisfying, due to the limited window pivot, requirements with regard to appearance. In addition, the configuration has a minimum number of plugs/contact pieces and only four plugs/contact pieces are necessary in the conventional vehicle lighting having three switch positions for ON, DC (door contact) and OFF.

8 Claims, 2 Drawing Sheets

INSIDE LIGHT

This application claims Paris Convention Priority of Federal Republic of Germany patent application DE 19624013.1 filed Jun. 15, 1996, the disclosure of which is hereby incorporated by reference.

BACKGROUND OF THE INVENTION

The invention concerns a light for vehicles having a switch and a pivotably borne window for illumination which operates the switch when pivoted. Lights for vehicles of this kind are known in the art with which a separate user-operated switching element is avoided for cost reasons as well as for reasons of appearance by having the window also perform this function. In the event that this window is configured to be long and narrow for reasons of appearance, for example approximately 78 mm by 23 mm, sufficient travel for operating the switch (without an excessive pivoting angle) can only be achieved if pivoting is effected about a transverse axis, wherein a lever arm of e.g. 78/2=39 mm is available. For reasons of appearance, the window travel should not exceed values of e.g. 2.5 mm. However, reliable switching of the light requires switch contact element travel of at least 3.5 mm and preferably 4 mm. In addition, the light and switch should be produced as economically as possible and the installation depth of the light should be minimized.

It is therefore the purpose of the invention to configure a light of the above-mentioned kind to guarantee reliable and safe switching in as inexpensive a manner as possible and with a minimized amount of window travel.

SUMMARY OF THE INVENTION

This purpose is achieved in that the switch has a contact lever borne in a pivotable fashion about an axis of rotation with the contact lever comprising an operation arm extending in a first direction from the axis of rotation and a contact arm extending in a second direction from the axis of rotation, wherein the operation arm comprises an operation region at a first separation with respect to the axis of rotation and the contact arm has a contact region having a second separation with respect to the axis of rotation, wherein the second separation is larger than the first separation and directed movement of the operation arm (through pivoting of the window) at the operation region pivots the contact lever about the axis of rotation and the contact region moves to operate the switch, wherein the window is coupled to the operation region. In this fashion, appropriate pressing on the window pivots same in one or in another direction to move the operation region of the switch through pushing or pulling. The invention has the advantage of having a simple mechanical construction which is economical to produce and which nevertheless leads to reliable operation of the switch. A small pivot angle of the window is sufficient to perform the switching function.

It is particularly preferred when the contact lever has a mounting tab disposed substantially parallel and in close proximity to the axis of rotation, which is in electrical contact with a light bulb. This has the advantage that the lighting configuration in accordance with the invention facilitates the use of one plug/contact less than usual. An embodiment of the configuration in accordance with the invention having three switch positions, has a parts list having e.g. only four contacts or plug components, in contrast to which a conventional parts list requires five such components. This is due to the fact that the contact lever has an additional mounting tab which protrudes at right angles with respect to the housing into the interior part of the light and is electrically connected to the light bulb. In embodiments in accordance with the invention having only two switching positions (for ON and OFF) only three contacts or plug components are present. The mounting tab is disposed in close proximity to the point of rotation of the contact lever so that it changes its position and angular orientation only to a limited extent during operation of the window for switching.

In an advantageous embodiment in accordance with the invention, the light comprises a housing having an injection-moulded pin which serves as the axis of rotation for the contact lever. This has the advantage that the pin about which the lever pivots is directly moulded onto the housing to reduce costs.

The light advantageously comprises a housing having a plurality of contacts with at least one contact being biased in the direction toward the contact lever to guarantee electrical contact between the contact region and the contact. The contacts preferentially join to externally accessible plug connections. Protrusions are advantageously disposed between the contacts to facilitate secure positioning thereof.

These measures have the advantage that the protrusions can be configured as latching protrusions whose walled disposition determines the operation properties of the switch. In this manner, an economical and reliable switching behaviour is facilitated. The pre-biasing of the contacts assures good electrical contact between the contact region of the contact lever and the contact.

In an advantageous improvement of this embodiment, the housing has a support which defines and limits the biasing of the contact towards the contact lever. This has the advantage, that, although the contacts are biased towards the contact lever, they nevertheless do not project excessively out of the switching plane, so that failure does not occur. The height of the housing support thereby limits the height to which the biased contacts can protrude in a perpendicular direction beyond the plane of switching.

One embodiment provides that the window has an injection-moulded arm which engages the operation region of the operation arm in such a fashion that the motion of the window leads to a switching motion of the contact lever. The arm is preferentially located at as large a separation as possible from the axis of rotation of the window. The transmission of the window motion facilitates a minimum tilting of the window while nevertheless leading to sufficient travel of the operation arm in the operation region to guarantee reliable switching behaviour. If e.g. the separation between the operation region and the axis of rotation is 12 mm and the separation between the axis of rotation and the contact region of the contact arm is 28 mm, a 2.5 mm window travel can lead to a switching motion for the contact lever in the contact region of approximately 5.8 mm.

In an advantageous improvement of this embodiment in accordance with the invention, the window is borne in a pivotable fashion about a second axis of rotation extending parallel to the axis of rotation of the contact lever. This has the advantage that, in particular for a very long and narrow window of approximately 78 mm by 23 mm, a lever arm is effected in the operation region having a sufficient length of approximately 78/2=39 mm. In this fashion, a travel of 2.5 mm on the end of the window leads to a tilt angle of less than 40, which is advantageous for reasons of appearance. In addition, the amount of force necessary to switch is sufficiently small.

It is particularly advantageous within the context of this improvement of an embodiment in accordance with the invention, when the second axis of rotation is preferentially disposed in the middle portion of the window. This has the advantage that, starting in a middle position, both a tilting about the axis of rotation in a clockwise direction as well as a tilting about the axis of rotation in a counterclockwise direction both lead to an identical tilting angle and therefore to a consistent switching motion in the contact region of the contact arm. In this manner, a minimized tilt angle is guaranteed in both cases which is nevertheless sufficient to effect the necessary travel in the contact region of the contact arm.

Further advantageous embodiments of the invention can be derived from the accompanying drawing. The above mentioned features of the invention and those to be further described below can be utilized in accordance with the invention individually or collectively in arbitrary combination. The embodiments of the drawing have exemplary character only and are not to be considered as an exhaustive enumeration of the advantageous configurations in accordance with the invention.

Figure 1:
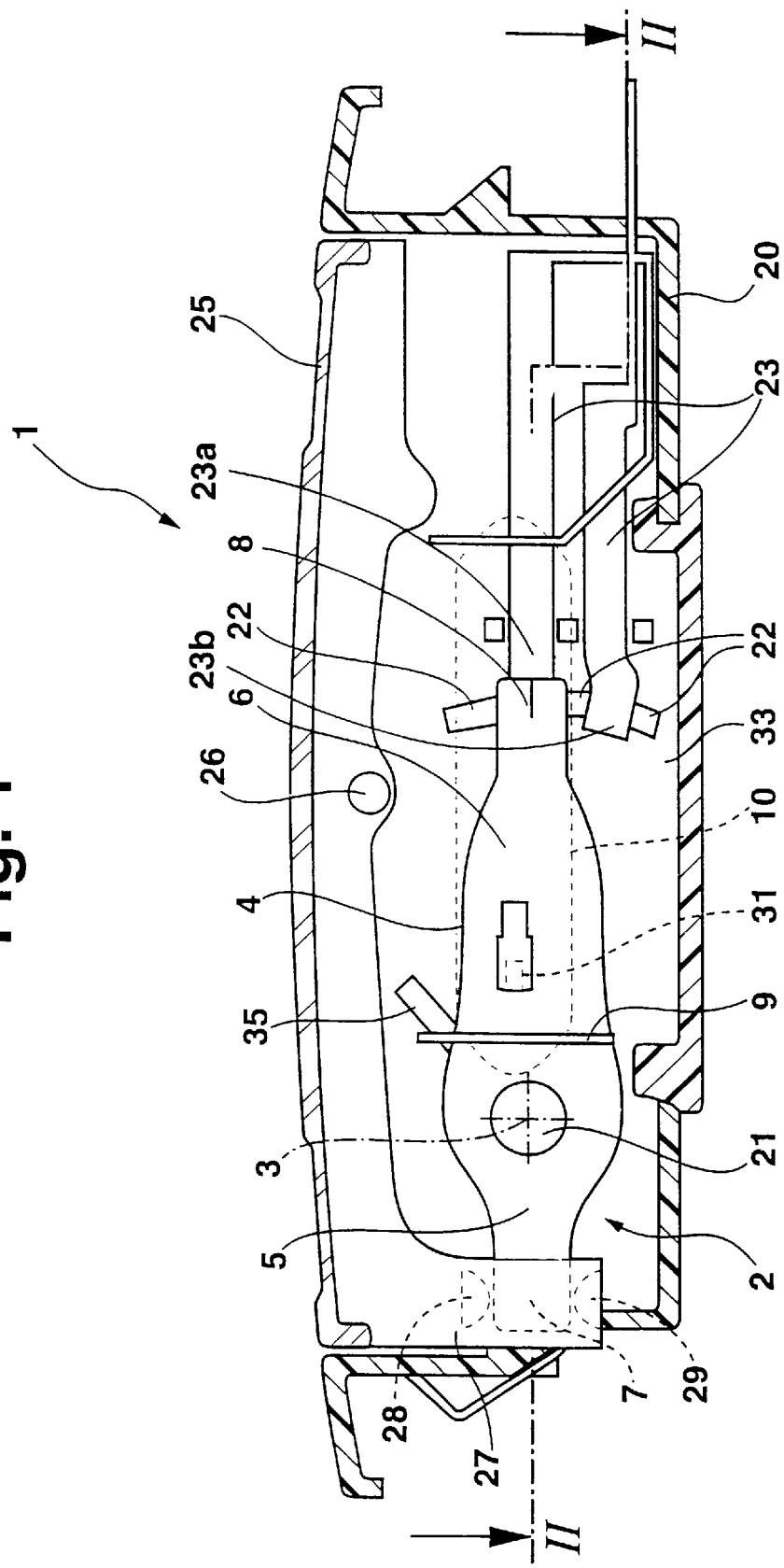
FIG. 1 shows a longitudinal cut through the lighting device in accordance with the invention along the line I—I of FIG. 2.

The objects of the figures are partially shown in a highly schematic fashion in order to better emphasize the properties in accordance with the invention. The elements in accordance with the invention are partially displayed in an enlarged or reduced fashion so that their function can more easily be recognized: the drawings are not to be taken to scale.

DESCRIPTION OF THE PREFERRED EMBODIMENT

The light 1 has a switch configuration 2 which is substantially distinguished by a contact lever 4 borne in a pivotable fashion about an axis of rotation 3. The contact lever 4 consists essentially of operation arm 5 extending in one direction away from the axis of rotation 3 as well as oppositely directed contact arm 6. The operation arm 5 has an operation region 7 on its end and the contact arm 6 has a contact region 8 on that end of the contact lever 4 lying opposite to the operation region 7. A mounting tab 9 extends in a plane directed largely perpendicular to the contact lever 4 and is disposed in close proximity to the axis of rotation 3 of the contact lever 4 so that the pivotal motion of the contact lever 4 during operation of the switch leads to as small a displacement of the position of the mounting tab 9 as possible. The mounting tab 9 is electrically connected to the contact lever 4 and is in electrically conducting contact with a light bulb 10. Neither this contact of the mounting tab 9 nor the position of the light bulb 10 are compromised by the small motion of the mounting tab 9 during operation of the switch 2 caused by the pivoting motion of the contact lever 4. The mounting tab 9 has a hole into which a conically shaped contact portion of the double-ended tubular light bulb 10 enters and is held for contacting and mounting of the light bulb. The mounting tab 9 is supported on a housing 20 protrusion at the region facing away from the remaining portions of contact lever 4. The contact region 8 is configured in an approximately wedge-shaped fashion, wherein the tip of the wedge in FIG. 1 points in a rear direction to cooperate with the contacts described below. The wedge shape cooperates mechanically with the latch protrusions described below to secure the current switching position while allowing the user to feel the arrival of the switch into its current switching position.

The light 1 has a housing 20 surrounding the switch 2 which includes a pin 21 effecting the axis of rotation 3 for the contact lever 4. The pin 21 can be integrally injection-moulded onto housing 20 to facilitate a single-piece configuration for avoiding additional costs. Latch protrusions 22 are disposed or moulded onto the housing 20 in such a fashion that a well-defined switching position of the contact arm 6 in the contact region 8 is guaranteed. In this manner, the latch protrusions 22 define the current switching position of the contact lever 4. Three switching positions are provided for in the embodiment in accordance with FIG. 1. Contacts 23 are arranged in such a fashion that the corresponding positions of the contact lever 4 effect particular electrical connections. In the embodiment in accordance with FIG. 1, two active contacts 23 or switching positions are provided for as is a switching position (with the contact region 8 in the upper position in FIG. 1) for the case when no current flows, i.e. in the event that the light is always switched off. In this fashion, switching positions can be achieved in a vehicle corresponding to ON, DC (door contact) and OFF.

A window 25 is disposed to pivot about a second axis of rotation 26 on the housing 20 and communicates with the operation region 7 of the contact lever 4 in such a fashion that pivoting of the window about the second axis of rotation 26 leads to a corresponding pivoting motion of the operation arm 5 about the axis of rotation 3 as well as to motion of the contact arm 6 in the contact region 8. In the embodiment in accordance with FIG. 1, pushing on the left part of the window 25 in the downward direction leads to an upward motion of the contact region 8. The light 1 is switched-off in this position. A subsequent pushing on the window 25 at the right part in a downward direction moves the window 25 into the horizontal position. This movement of the window 25 leads to motion of the contact arm 6 in the contact region 8 in a downward direction to assume a horizontal position. Further downward pressing on the window 25 at the right portion thereof leads to a tilting of the window 25 and to a downward pivoting motion of the contact lever 4 in the contact region, wherein the lower of the two illustrated contacts 23 is electrically connected to the contact region 8 of the contact arm 6.

The window 25 advantageously has a moulded arm 27 which is in active communication with the operation arm 5 of the contact lever 4 in the operation region 7. The arm 27 covers the operation region 7 in the view of FIG. 1 and moves same with the assistance of two protrusions 28 and 29 which surround the operation region 7 on both sides.

A lip 31 which is stamped-out of the contact arm 6 and which, in the view of FIG. 1, is behind a side wall 33 of the light holds, along with the arm 27, the contact lever 4 on the pin 21. The contact lever 4 can be removed from the pin 21 when the contact arm 4 is rotated in a counterclockwise direction in the representation of FIG. 1 up to the point at which the lip 31 comes into the region of a through-hole in the side wall 33, wherein the arm 27 is previously lifted in a spring-loaded manner. Assembly is effected in reverse order.

The second axis of rotation 26 about which the window 25 can rotate extends parallel to the short side edge of the substantially rectangular window 25. The arm 27 is located at one end of the window 25 and therefore at as large a separation as possible from the second axis of rotation 26 so that it is moved to as large a degree as possible when the window is pivoted. It is also possible to mount the contact lever 4 on a transverse side wall instead of on a longitudinal side wall of the light (as described) so that the two pivot axes are not parallel.

The plugs 40 (see FIG. 2) project out of the housing 20 to effect good electrical contact with a connecting component for the electrical circuit. Each of the two plugs 40 leads to a contact 23 and one of the plugs 40 is connected to light bulb 10 (at the right in the figures). The contacts 23 are biased in the vicinity of the contact region 8 by means of housing support 24. The housing support 24 also prevents the biased contacts 23 from substantially-projecting out of the plane of rotation of the contact lever 4 which could possibly lead to failure of the switch 2.

Figure 2:
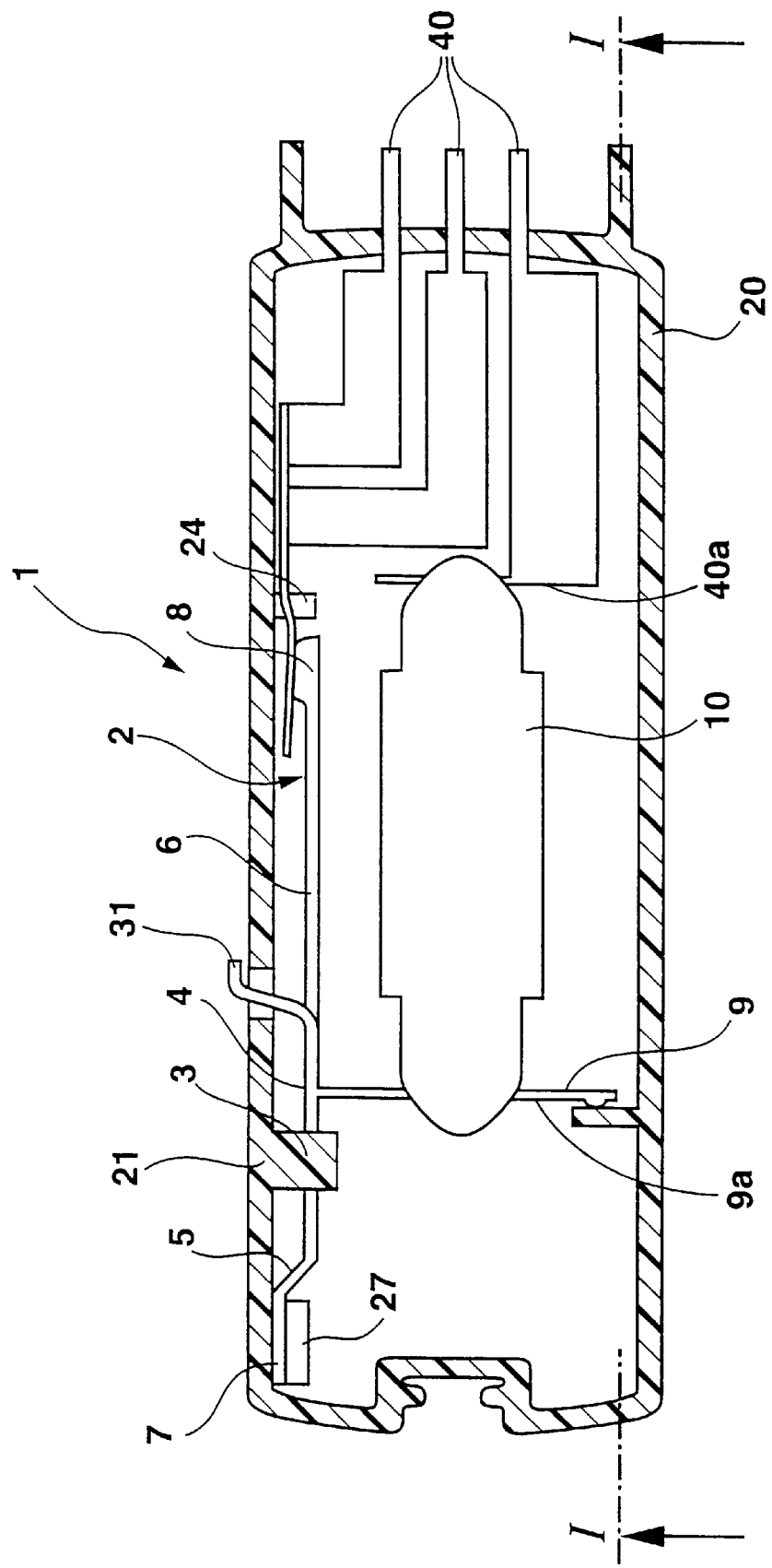
FIG. 2 shows a longitudinal cut through the lighting device in accordance with the invention according to FIG. 1 along the line II—II of FIG. 1, wherein the housing is partly cut in the plane of the first rotational axis and light bulb, and partly cut in the plane of the feed-throughs for the plugs.

The representation FIGS. 1 and 2 clearly show that, in contrast to the conventional window switch configuration, the configuration in accordance with the invention has only four contacts 23*a*, 23*b*, 9*a* and 40*a* so that one contact less than usual is present.

A light 1 for vehicles having a switch 2 and having a pivotably mounted window 25 for illumination, the pivoting of which causes operation of the switch 2, is characterized in that the switch 2 has a contact lever 4 borne in a pivotable fashion about an axis of rotation 3, the contact lever 4 having an operation arm 5 extending in a first direction away from the axis of rotation 3 as well as a contact arm 6 extending in a second direction away from the axis of rotation 3, wherein the operation arm 5 has an operation region 7 at a first separation with respect to the axis of rotation 3 and the contact arm 6 has a contact region 8 at a second separation with respect to the axis of rotation 3, wherein the second separation is larger than the first separation and, by means of a directed motion of the operation arm 5 in the operation region 7, the contact lever 4 pivots about the axis of rotation 3 and the contact region 8 moves in such a fashion as to operate the switch 2. The window 25 is coupled to the operation region 7. This lighting configuration guarantees reliable switching in an economical fashion and, due to the limited window pivot, simultaneously satisfies the requirements with regard to appearance. In addition, the configuration has a minimum number of plugs/contact pieces with only four plugs/contact elements being necessary in the conventional vehicle light having three switch positions for ON, DC (door contact) and OFF.

I claim:

1. Light for use inside a vehicle, the light having an illumination source with a first and a second terminal, the light comprising:

a housing;

first contact means, mounted in said housing and electrically connected to the first terminal;

a contact lever pivotably borne on and within said housing to pivot about a first axis of rotation, said contact lever having an operation arm extending in a first direction away from said first axis of rotation, said contact lever also having a contact arm extending in a second direction away from said first axis of rotation, said operation arm having an operation region located at a first separation from said first axis of rotation, said contact arm having a contact region located at a second separation from said first axis of rotation, wherein said second separation is larger than said first separation, said contact lever having a mounting tab adjacent to said first axis of rotation and extending substantially parallel to said first axis of rotation, said mounting tab in electrical contact with the second terminal;

second contact means, mounted in said housing and electrically connected to said contact region; and a window made from a material permeable to optical radiation, said window cooperating with said operation region to pivot said contact lever about said first axis of rotation for moving said contact region into and out of electrical contact with said second contact means.

2. The light of claim 1, wherein said first axis of rotation consists essentially of an injection-moulded pin attached to said housing.

3. The light of claim 1, wherein said second contact means comprises a plurality of contacts mounted to said housing and pre-biased towards said contact lever to secure electrical contact between said contact region and said plurality of contacts.

4. The light of claim 3, wherein said housing comprises a support to define and limit biasing of said plurality of contacts towards said contact lever.

5. The light of claim 1, wherein said window is borne on said housing to pivot about a second axis of rotation extending substantially parallel to said first axis of rotation.

6. The light of claim 5, wherein said second axis of rotation is disposed in a middle region of said window.

7. The light of claim 1, wherein said second contact means comprises one contact component for a first switching position.

8. The light of claim 1, wherein said second contact means comprises two contact components for a first and a second switching position.

* * * * *